United States Patent [19]

Neely

[11] Patent Number: 5,717,833
[45] Date of Patent: Feb. 10, 1998

[54] SYSTEM AND METHOD FOR DESIGNING FIXED WEIGHT ANALOG NEURAL NETWORKS

[75] Inventor: William Shields Neely, Campbell, Calif.

[73] Assignee: National Semiconductor Corporation, Santa Clara, Calif.

[21] Appl. No.: 676,443

[22] Filed: Jul. 5, 1996

[51] Int. Cl.$^6$ ................................................. G06F 15/18
[52] U.S. Cl. ............................................. 395/24; 364/488
[58] Field of Search ............................. 395/24; 364/488, 364/491

[56] References Cited

U.S. PATENT DOCUMENTS

| | | | |
|---|---|---|---|
| 5,222,193 | 6/1993 | Brooks | 395/23 |
| 5,293,458 | 3/1994 | Chung | 395/27 |
| 5,347,613 | 9/1994 | Chung | 395/24 |
| 5,519,811 | 5/1996 | Yoneda | 395/24 |

OTHER PUBLICATIONS

Eberhardt, "Design of hardware neural network systems from custom analog vlsi builing block chips," IJCNN; Jun. 18–22, 1989, vol. 2.
Mead, "Analog vlsi implementation of neural systems," Chapter 9, Kluwer academic publishers, Boston, Dec. 1989.
Rossetto, "Analog vlsi synaptic matrices as building blocks for neural networks," IEEE micro, Dec. 1989.
Faggin, "VLSI implementation of neural networks," An introduction to neural and electronic networks, Academic Press, Inc., Dec. 1990.
Hiroshi Ishii, Tadashi Shibata, Hideo Kosaka and Tadahiro Ohmi, "Hardware–Backpropagation Learning of Neuron MOS Neural Networks", 1992 IEEE, pp. 16.4.1–16.4.4.
W. Shields Neely and Chwan–Hwa John Wu, "A New Training Method for Precision–Limited Analog Neural Networks", 1994 IEEE, pp. 2022–2027.
Koji Kotani, Tadashi Shibata and Tadahiro Ohmi, "Neuron–MOS Binary–Logic Circuits Featuring Dramatic Reduction in Transistor Count and Interconnections", 1992 IEEE, pp. 16.3.1–16.3.4.

*Primary Examiner*—David K. Moore
*Assistant Examiner*—Jeffrey S. Smith
*Attorney, Agent, or Firm*—Limbach & Limbach L.L.P.

[57] ABSTRACT

A system and method for designing a fixed weight analog neural network to perform analog signal processing allows the neural network to be designed with off-line training and implemented with low precision components. A global system error is iteratively computed in accordance with initialized neural functions and weights corresponding to a desired analog neural network configuration for analog signal processing. The neural weights are selectively modified during training and then expected values of weight implementation errors are added thereto. The error adjusted neural weights are used to recompute the global system error and the result thereof is compared to a desired global system error. These steps are repeated as long as the recomputed global system error is greater than the desired global system error. Following that, MOSFET parameters representing MOSFET channel widths and lengths are computed which correspond to the neural functions and weights. Such MOSFET device parameters are then used to implement the desired analog neural network configuration.

15 Claims, 6 Drawing Sheets

1

SYSTEM AND METHOD FOR DESIGNING FIXED WEIGHT ANALOG NEURAL NETWORKS

BACKGROUND OF THE INVENTION

1. Field of the Invention

The present invention relates to fixed weight analog neural networks, and in particular, to systems and methods for designing fixed weight analog neural networks using low precision components.

2. Description of the Related Art

Various forms of analog neural networks are well known in the art, as are techniques for training such neural networks. However, once training of the neural network has been completed and it is desired to implement the resulting neural network design in such a manner as to allow repeated fabrications of such neural network with consistent performance and fixed weights, it has been necessary to construct such a neural network with transistors which are large in size and high in precision. Therefore, implementing such neural networks has been difficult and costly.

Accordingly, it would be desirable to have a system and method for designing fixed weight analog neural networks which can tolerate being fabricated with transistors which are smaller in size and lower in precision.

SUMMARY OF THE INVENTION

A system and method in accordance with the present invention allow fixed weight analog neural networks for performing analog signal processing to be designed with off-line training and implementation with low precision components.

In accordance with one embodiment of the present invention, a system including a programmed computer, a method of programming a computer and a computer implemented method for designing a fixed weight analog neural network to perform analog signal processing implement the steps of:

establishing data representing a desired analog neural network configuration for analog signal processing which includes neurons having neural functions and neural weights having neural weight values;

establishing data representing a desired global error for such desired analog neural network configuration;

establishing data representing expected values of weight implementation errors;

establishing data representing initial values for the neural weight values;

(a) computing an actual global error iteratively in accordance with the neural functions and neural weight values and in accordance therewith modifying selected ones of the neural weight values;

(b) adding the expected values of weight implementation errors to the neural weight values to establish error adjusted neural weight values;

(c) recomputing the actual global error in accordance with the neural functions and error adjusted neural weight values to establish a recomputed global error function;

(d) comparing the recomputed global error to the desired global error;

repeating steps (a) through (d) if the recomputed global error is greater than the desired global error;

computing a first set of MOSFET parameters which correspond to the neural functions and represent a first set of MOSFET channel widths and lengths;

computing a second set of MOSFET parameters which correspond to the neural weight values and represent a second set of MOSFET channel widths and lengths; and outputting data representing the first and second sets of MOSFET parameters.

These and other features and advantages of the present invention will be understood upon consideration of the following detailed description of the invention and the accompanying drawings.

DETAILED DESCRIPTION OF THE INVENTION

Figure 1:
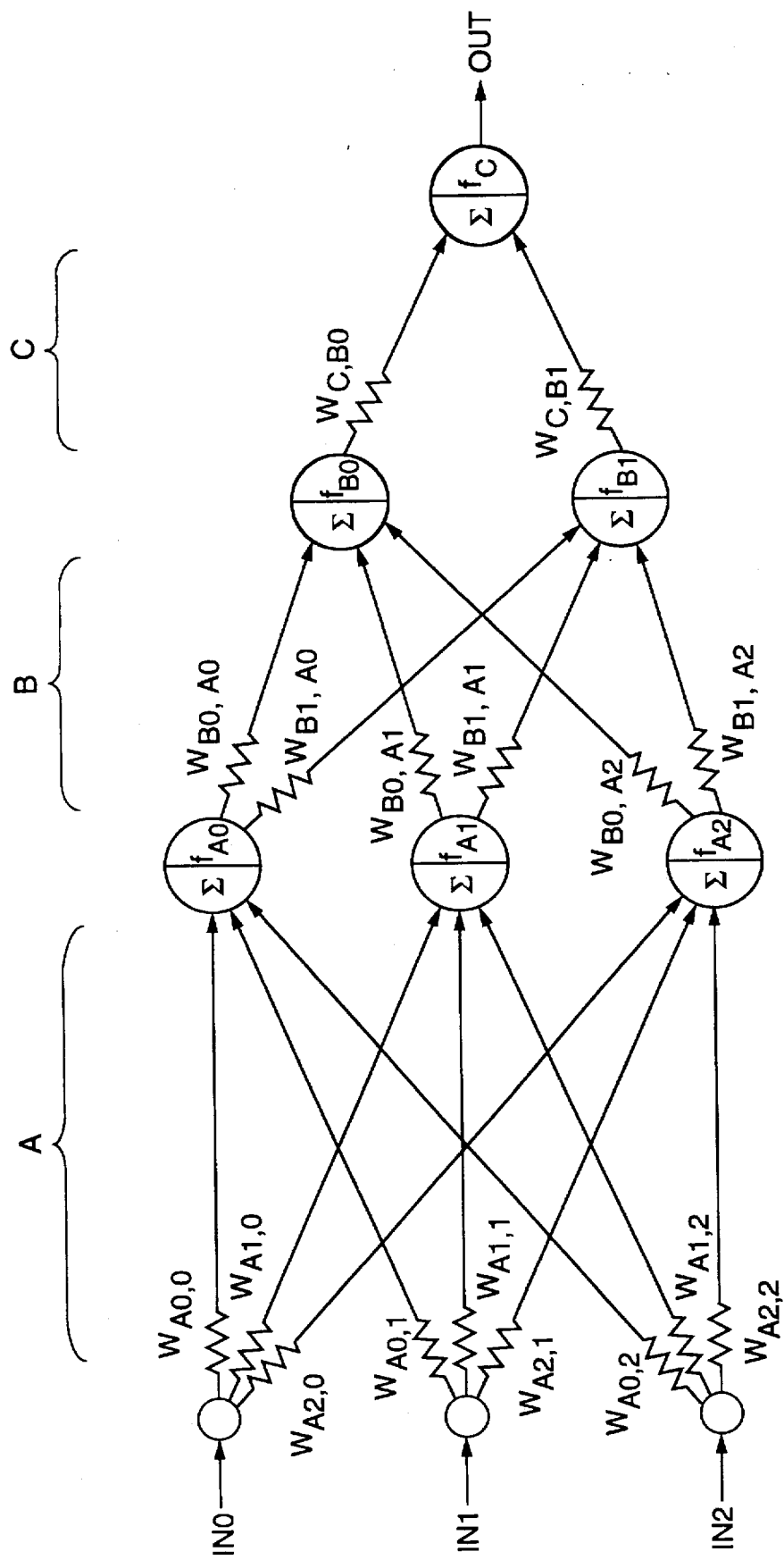
FIG. 1 is a functional schematic diagram of a fixed weight analog neural network in the form of a three-input, one-output, three-layer multiple layer perceptron.

Referring to FIG. 1, one example of a fixed weight analog neural network for performing analog signal processing which can be designed in accordance with the present invention is a three-input, one-output, three-layer multiple layer perceptron (MLP) which has multiple layers of neurons with interlayer fixed weights connecting them, as shown. The three input signals IN0, IN1, IN2 are weighted by their respective interlayer weights $W_{ij}$, with the results being summed and processed in accordance with the individual neural functions $f_{AN}$. This processing, in accordance with well-known techniques, is continued through the remaining layers to produce the final output OUT.

Figure 2:
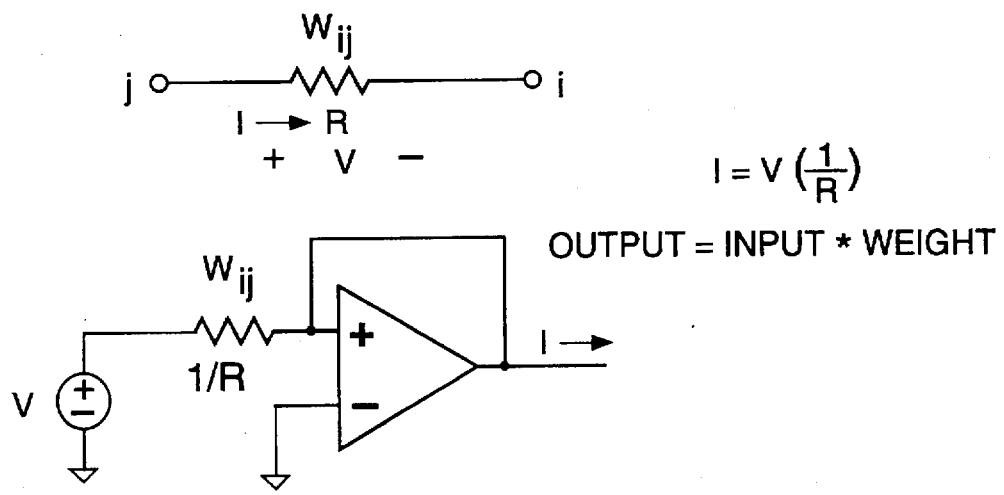
FIG. 2 illustrates schematically how fixed weights for analog neural networks can be implemented.

Referring to FIG. 2, interlayer neural weights can be implemented in the form of resistances, where the input voltage V is "weighted" in accordance with the resistance R to produce the output current I. Such resistance can be used alone, or with an operational amplifier (as shown) for buffering.

Figure 3:
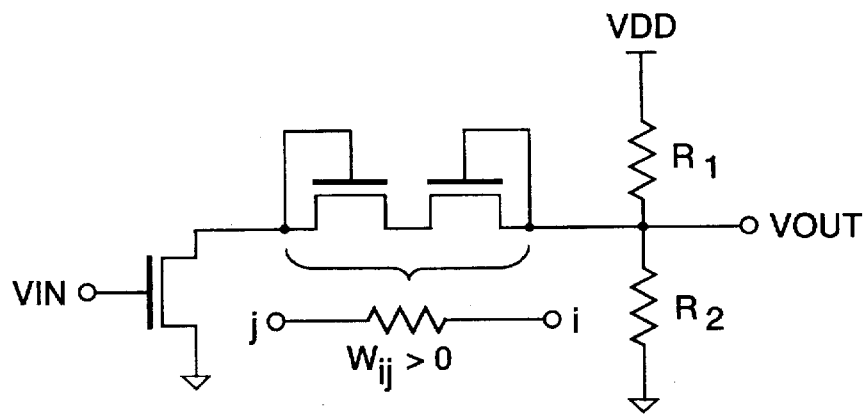
FIG. 3 illustrates schematically how positive and negative weights for analog neural networks can be implemented.
Figure 3:
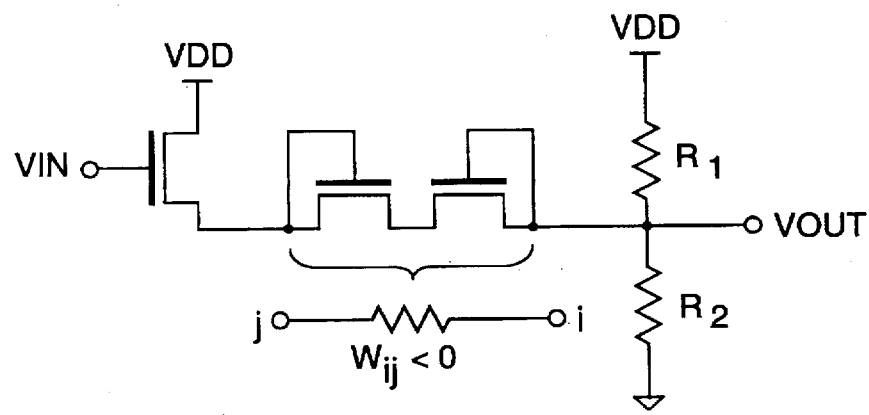

Referring to FIG. 3, positive and negative neural weights (with inverting sigmoid functions) can be implemented as shown. A resistive voltage divider is driven by either a pull-down or pull-up transistor via a dual metal oxide semiconductor field effect transistor (MOSFET) transmission gate when implementing positive and negative weights, respectively. For the positive and negative weights, as the input voltage VIN increases, the output VOUT decreases and increases, respectively.

Figure 4:
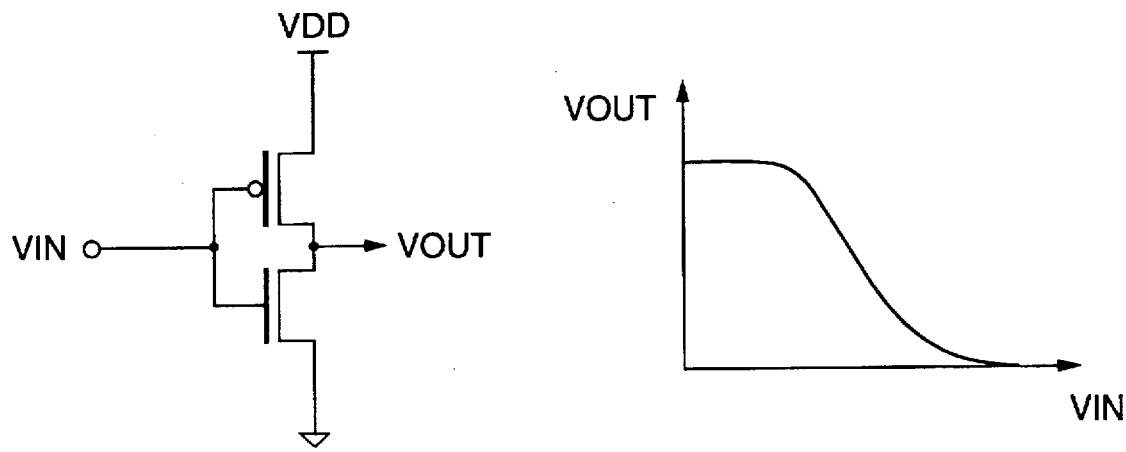
FIG. 4 illustrates schematically how a sigmoid neural function can be implemented with a MOSFET inverter.

Referring to FIG. 4, a sigmoid neural function can be implemented in the form of a sigmoid circuit constructed from a suboptimized MOSFET inverter circuit, as shown. As the input voltage VIN increases, the output voltage VOUT decreases, as shown in the graph.

Figure 5:
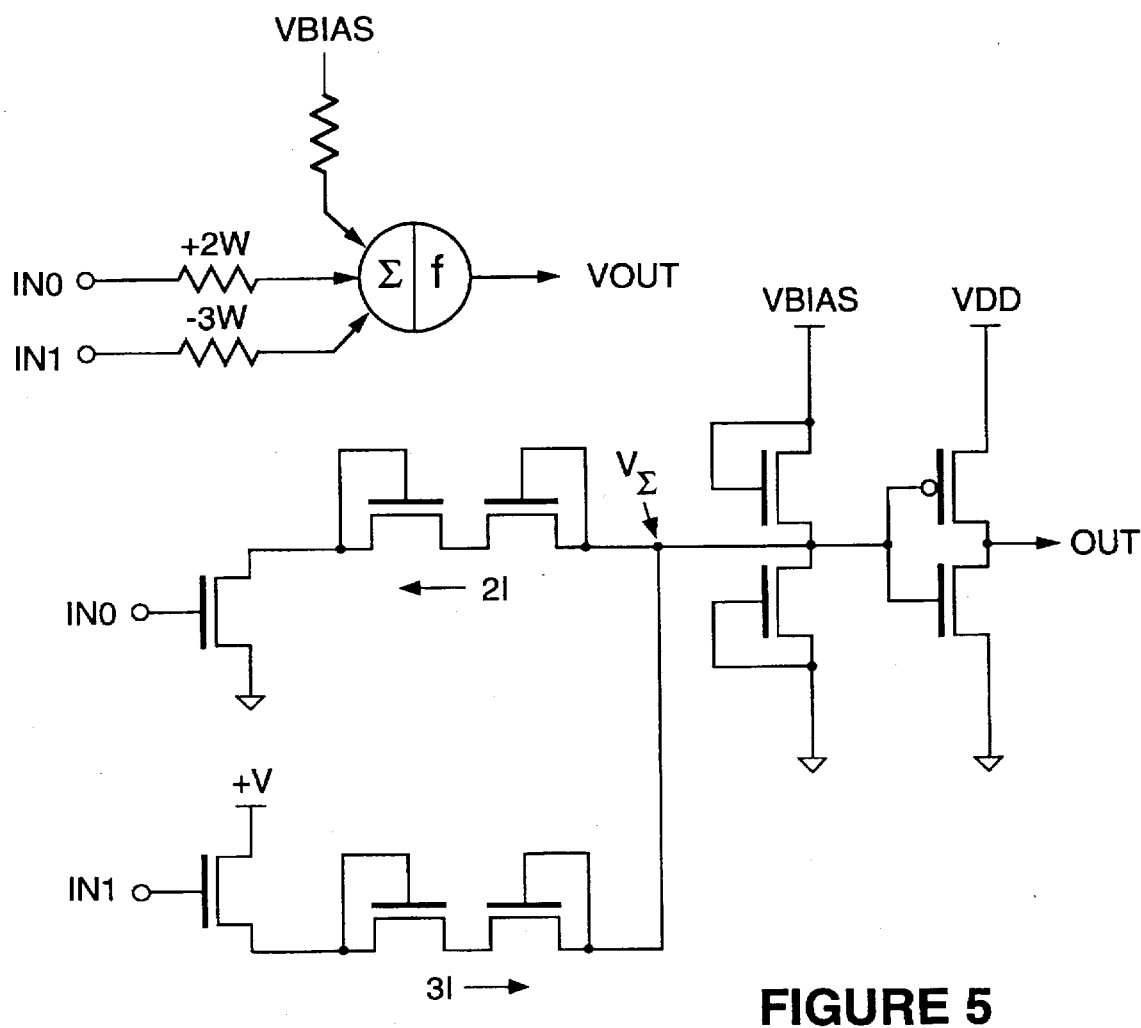
FIG. 5 illustrates schematically how a two-input neuron with fixed weights and a bias can be implemented using MOSFETS.

Referring to FIG. 5, one example of a two-input neuron with fixed weights and a bias can be implemented with pull down and pull up transistors driving a summing node via dual MOSFET transmission gates, with the summing node being biased by a bias circuit and driving a suboptimized inverter circuit, as shown. The summation of the currents 2I, 3I at the summing node determines how much current is drawn out or added via the biasing circuit.

Figure 6:
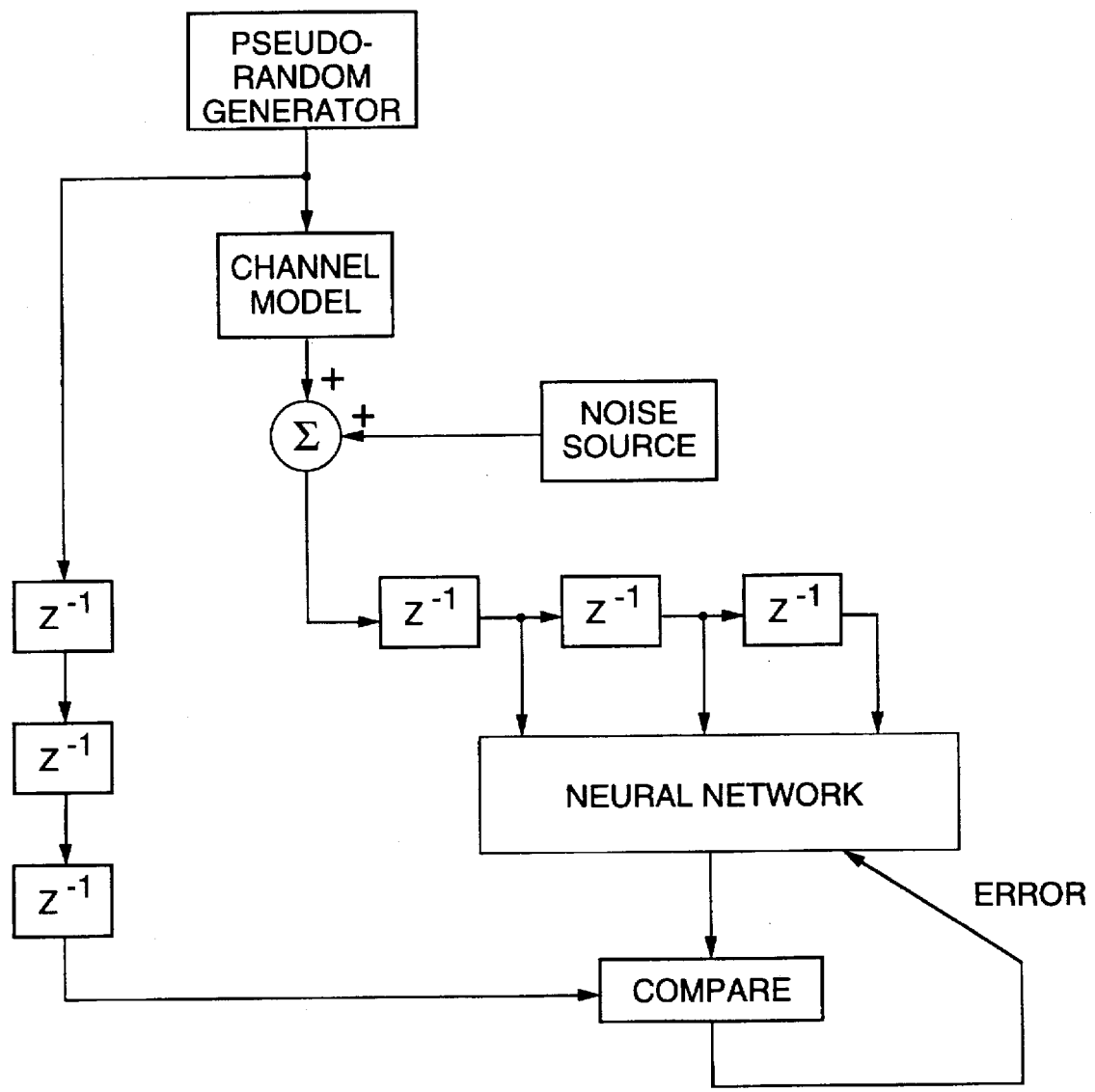
FIG. 6 is a functional block diagram of a system which can be used for training an analog neural network in accordance with the present invention.

Referring to FIG. 6, one example of a system for training a neural network, such as that depicted in FIG. 1, can be implemented as shown. A pseudo-random data generator provides a series of pseudo-random data which is processed by a channel model (e.g., a model of a magnetic read channel, a digital wireless receiver channel, or a cable or fiber optic cable receiver channel). The resulting transformed data is summed with uncorrelated noise from a noise source, and then sequentially delayed by a series of unit time delays for inputting to the neural network. The output of the neural network is then compared against a similarly time delayed version of the original pseudo-random data. The difference, or error, between these two signals is then fed back into the neural network for back propagation (in accordance with well-known techniques) to adjust the interlayer neural weights within the neural network. Once the neural network has been trained to accurately recover data from the distorting channel, design parameters can be extracted from the neural network for use in designing a fixed weight analog neural network (discussed in more detail bellow).

Figure 7:
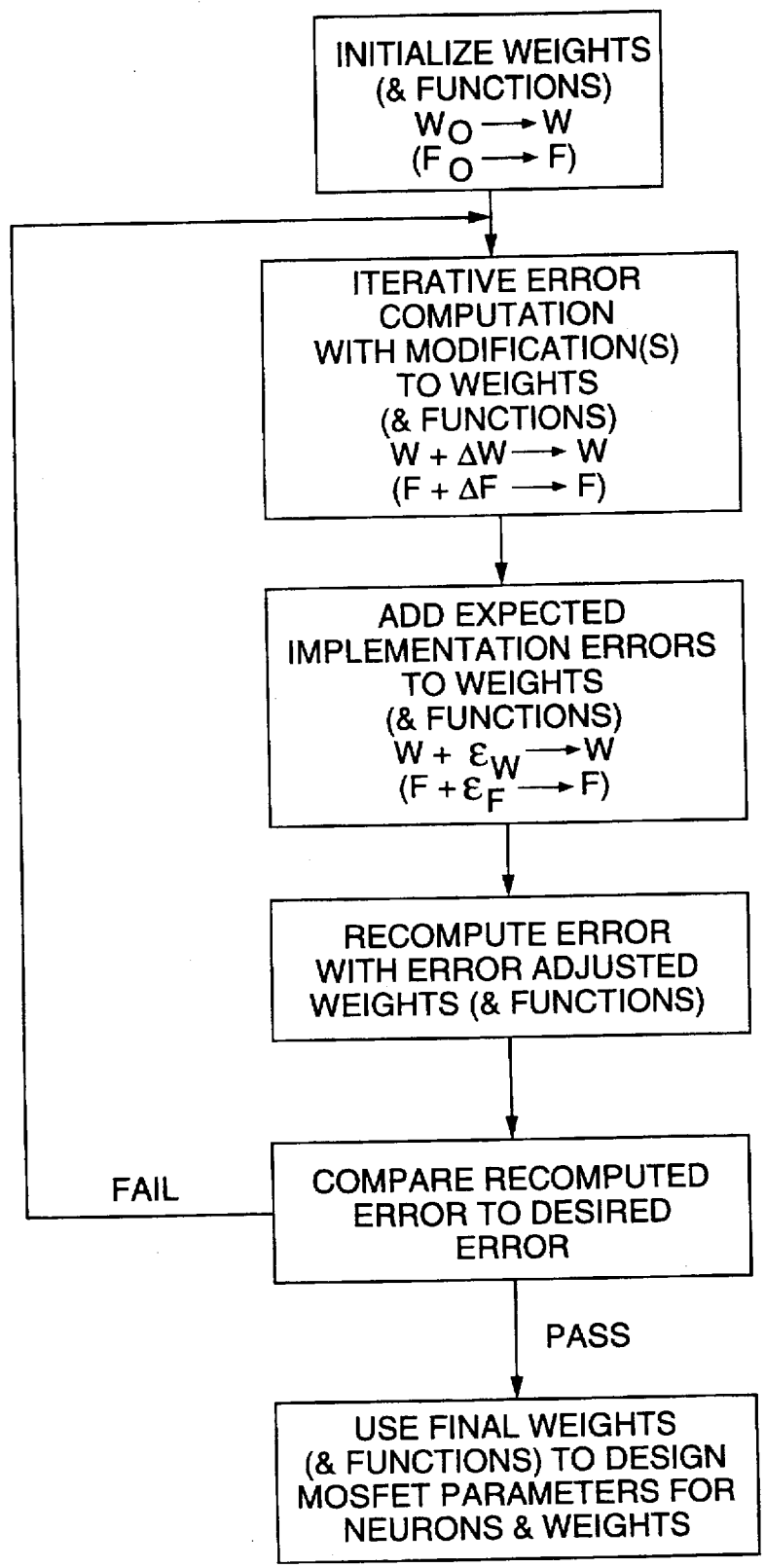
FIG. 7 is a flow-chart of the method used for training an analog neural network in accordance with the present invention.

Referring to FIG. 7, one example of a method for training a neural network off-line for generating the neural network design parameters to be used for designing a fixed weight analog neural network begins with first initializing the neural weights and functions of the neural network intended to be trained. Using these initialized values, an iterative error computation is performed, whereby the global system error is computed. One example of this iterative error computation would be to use a gradient descent method, such as back propagation with a specified learning rate and momentum. During this iterative computational process, the resulting errors are used to then modify the neural weights (and, if desired, the neural functions, as discussed in more detail below).

Following that, values representing expected implementation errors are added to the weights (and, if desired, used to modify the functions). Such expected implementation errors represent performance errors which are expected to be encountered with the final circuit implementation and can be determined based upon known characteristics of the semiconductor fabrication process to be used, or determined empirically. Once the expected implementation errors have been used to appropriately modify the weights (and, if desired, the functions), the global system error is then recomputed using such adjusted weights (and functions).

The recomputed global system error is then compared to the desired global system error. If the recomputed global system error is greater than the desired global system error, the foregoing steps, beginning with the iterative error computation, are repeated, until such time as the recomputed global system error is no longer greater than the desired global system error.

Once the recomputed global system error is no longer greater than the desired global system error, the resulting design parameters representing the final neural weights and functions can be extracted for use in designing the MOSFET parameters to be used for actually implementing the neurons and weights in hardware, e.g., an integrated circuit.

As noted above, the neural weights and functions can be modified, as desired, based upon the iterative global system error computation so as to achieve an optimum neural network design. Typically, the neural functions, once initially designed, are maintained and any subsequent modifications, based upon computed global system error, are made only to the neural weights. However, it should be understood that, while it may perhaps be somewhat more difficult, it is nonetheless possible to also provide for making appropriate modifications to the neural functions themselves.

Figure 8:
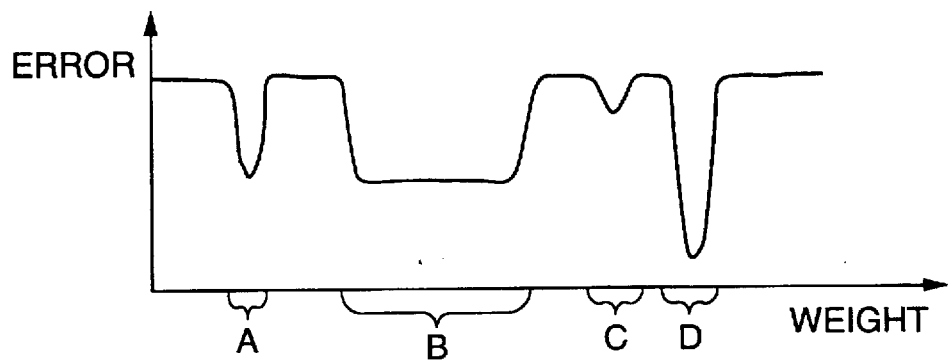
FIG. 8 is a graph representing various forms of error minima for analog neural networks designed in accordance with the present invention.

Referring to FIG. 8, one example of a technique for implementing the above-discussed method for training the neural network off-line takes into account that the global system error can have a number of minima. For example, for a given weight value, region A represents a narrow error "valley," while region B represents a wide error valley. Region C includes a local global system error minima, while region D includes a global minima for the global system error. Accordingly, by selecting an appropriate desired global system error and using the above-discussed method, the individual neural weight values can be determined whereby relatively large variations in the weights values (e.g., due to implementation errors) can be tolerated before the global system error becomes greater than desired.

For example, for each individual neural weight, the corresponding global system error function for such weight, as represented by FIG. 8, would ideally have the value of the weight approximately centered in region B.

Figure 9:
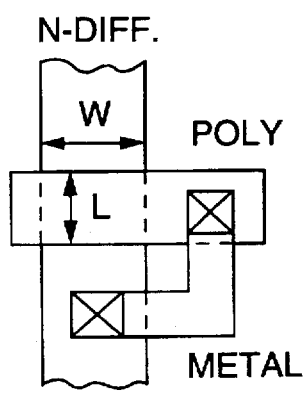
FIG. 9 represents an integrated MOSFET which can be designed for use in an analog neural network in accordance with the present invention.

Referring to FIG. 9, once the neural network has been trained off-line, its design parameters can be extracted for designing the MOSFETS which will be used to actually implement the neural network in hardware. The width W and length L of the channel of the subject MOSFET, e.g., as determined by the area of polysilicon overlapping the N-diffusion, can be computed in accordance with well-known MOSFET design techniques. For example, it is well-known that the relative gain of a MOSFET, i.e., its transconductance, is proportional to the width divided by the length of the MOSFET channel, in accordance with the mobility of the charge carriers and the permittivity and thickness of the insulating material (e.g., oxide between the polysilicon and N-diffusion layers) as follows:

$$\beta = \frac{\mu\epsilon}{t_{ox}}\left(\frac{W}{L}\right)$$

where:
$\beta$=transconductance
$\mu$=charge carrier mobility
$\epsilon$=oxide permittivity
$t_{ox}$=oxide thickness
W=channel width
L=channel length Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of designing a fixed weight analog neural network to perform analog signal processing, said method comprising the steps of:

operating a computer to perform the steps of:
generating a first plurality of data signals representing a desired analog neural network configuration for analog signal processing which includes a plurality of neurons having a corresponding plurality of neural functions and a plurality of neural weights having a corresponding plurality of neural weight values;

generating a second plurality of data signals representing a desired global error for said desired analog neural network configuration;

generating a third plurality of data signals representing a plurality of expected values of weight implementation errors;

generating a fourth plurality of data signals representing a plurality of initial values for said plurality of neural weight values;

processing said first, second, third and fourth pluralities of data signals to perform the steps of
  (a) computing an actual global error iteratively in accordance with said plurality of neural functions and said plurality of neural weight values and in accordance therewith modifying selected ones of said plurality of neural weight values,
  (b) adding said plurality of expected values of weight implementation errors to said plurality of neural weight values to establish a plurality of error adjusted neural weight values,
  (c) recomputing said actual global error in accordance with said plurality of neural functions and said plurality of error adjusted neural weight values to establish a recomputed global error,
  (d) comparing said recomputed global error to said desired global error,
  (e) repeating said steps (a) through (d) if said recomputed global error is greater than said desired global error,
  (f) computing a first plurality of MOSFET parameters which correspond to said plurality of neural functions and represent a first plurality of MOSFET channel widths and lengths, and
  (g) computing a second plurality of MOSFET parameters which correspond to said plurality of neural weight values and represent a second plurality of MOSFET channel widths and lengths;

generating and outputting a fifth plurality of data signals representing said first and second pluralities of MOSFET parameters; and receiving said fifth plurality of data signals and in accordance therewith fabricating a plurality of MOSFETs which include said first and second pluralities of MOSFET channel widths and lengths based upon said first and second pluralities of MOSFET parameters.

2. The method of claim 1, wherein said step (a) comprises computing an actual global error iteratively in accordance with said plurality of neural functions and said plurality of neural weight values and in accordance therewith determining a desired global error minima and in accordance therewith modifying selected ones of said plurality of neural weight values.

3. The method of claim 1, wherein:
said said step of processing said first, second, third and fourth pluralities of data signals to perform said steps (a), (b), (c), (d), (e), (f) and (g) includes, prior to said step (a), the steps of
  generating a sixth plurality of data signals representing a plurality of initial functions for said plurality of neural functions, and
  generating a seventh plurality of data signals representing a plurality of expected values of neural function implementation errors;

said step of processing said first, second, third and fourth pluralities of data signals to perform the steps of (a), (b), (c), (d), (e), (f) and (g) includes processing said sixth and seventh pluralities of data signals along with said first, second, third and fourth pluralities of data signals to perform said steps (a), (b), (c), (d), (e), (f) and (g);

said step (a) comprises computing an actual global error iteratively in accordance with said plurality of neural functions and said plurality of neural weight values and in accordance therewith modifying selected ones of said plurality of neural weight values and selected ones of said plurality of neural functions;

said step (b) further comprises modifying said plurality of neural functions in accordance with said plurality of expected values of neural function implementation errors to establish a plurality of error adjusted neural functions; and said step (c) comprises recomputing said actual global error in accordance with said plurality of error adjusted neural functions and said plurality of error adjusted neural weight values to establish a recomputed global error.

4. The method of claim 1, wherein said step (a) comprises performing an iterative gradient descent computation with said plurality of neural functions and said plurality of neural weight values.

5. The method of claim 1, wherein said step (a) comprises performing back propagation with a learning rate and momentum associated therewith.

6. A method of designing a fixed weight analog neural network to perform analog signal processing, said method comprising the steps of:

programming a computer to generate a first plurality of data signals representing a desired analog neural network configuration for analog signal processing which includes a plurality of neurons having a corresponding plurality of neural functions and a plurality of neural weights having a corresponding plurality of neural weight values;

programming said computer to generate a second plurality of data signals representing a desired global error for said desired analog neural network configuration;

programming said computer to generate a third plurality of data signals representing a plurality of expected values of weight implementation errors;

programming said computer to generate a fourth plurality of data signals representing a plurality of initial values for said plurality of neural weight values;

programming said computer to process said first, second, third and fourth pluralities of data signals to perform the steps of:

(a) computing an actual global error iteratively in accordance with said plurality of neural functions and said plurality of neural weight values and in accordance therewith modifying selected ones of said plurality of neural weight values, (b) adding said plurality of expected values of weight implementation errors W said plurality of neural weight values to establish a plurality of error adjusted neural weight values, (c) recomputing said actual global error in accordance with said plurality of neural functions and said plurality of error adjusted neural weight values to establish a recomputed global error, (d) comparing said recomputed global error to said desired global error, (e) repeating said steps (a) through (d) if said recomputed global error is greater than said desired global error, (f) computing a first plurality of MOSFET parameters which correspond to said plurality of neural functions and represent a first plurality of MOSFET channel widths and lengths, and (g) computing a second plurality of MOSFET parameters which correspond to said plurality of neural weight values and represent a second plurality of MOSFET channel widths and lengths; and programming said computer to generate and output a fifth plurality of data signals representing said first and second pluralities of MOSFET parameters;

receiving said fifth plurality of data signals and in accordance therewith fabricating a plurality of MOSFETs which include said first and second pluralities of MOSFET channel widths and lengths based upon said first and second pluralities of MOSFET parameters.

7. The method of claim 6, wherein said step (a) comprises programming said computer to compute an actual global error iteratively in accordance with said plurality of neural functions and said plurality of neural weight values and in accordance therewith determine a desired global error minima and in accordance therewith modify selected ones of said plurality of neural weight values.

8. The method of claim 6, wherein:

said method further comprises programming said computer to perform, prior to said step (a), the steps of:

generating a sixth plurality of data signals representing a plurality of initial functions for said plurality of neural functions;

generating a seventh plurality of data signals representing a plurality of expected values of neural function implementation errors; and processing said sixth and seventh pluralities of data signals along with said first, second, third and fourth pluralities of data signals to perform said steps (a), (b), (c), (d), (e), (f) and (g);

said step (a) comprises programming said computer to compute an actual global error iteratively in accordance with said plurality of neural functions and said plurality of neural weight values and in accordance therewith modify selected ones of said plurality of neural weight values and selected ones of said plurality of neural functions;

said step (b) further comprises programming said computer to modify said plurality of neural functions in accordance with said plurality of expected values of neural function implementation errors to establish a plurality of error adjusted neural functions; and said step (c) comprises programming said computer to recompute said actual global error in accordance with said plurality of error adjusted neural functions and said plurality of error adjusted neural weight values to establish a recomputed global error.

9. The method of claim 6, wherein said step (a) comprises programming said computer to perform an iterative gradient descent computation with said plurality of neural functions and said plurality of neural weight values.

10. The method of claim 6, wherein said step (a) comprises programming said computer to perform back propagation with a learning rate and momentum associated therewith.

11. A computer implemented method of designing a fixed weight analog neural network to perform analog signal processing, said method comprising the steps of:

generating and storing a first plurality of data signals representing a desired analog neural network configuration for analog signal processing which includes a plurality of neurons having a corresponding plurality of neural functions and a plurality of neural weights having a corresponding plurality of neural weight values;

generating and storing a second plurality of data signals representing a desired global error for said desired analog neural network configuration;

generating and storing a third plurality of data signals representing a plurality of expected values of weight implementation errors;

generating and storing a fourth plurality of data signals representing a plurality of initial values for said plurality of neural weight values;

processing said first, second, third and fourth pluralities of data signals to perform the steps of (a) computing an actual global error iteratively in accordance with said plurality of neural functions and said plurality of neural weight values and in accordance therewith modifying selected ones of said plurality of neural weight values, (b) adding said plurality of expected values of weight implementation errors to said plurality of neural weight values to establish a plurality of error adjusted neural weight values, (c) recomputing said actual global error in accordance with said plurality of neural functions and said plurality of error adjusted neural weight values to establish a recomputed global error, (d) comparing said recomputed global error to said desired global error, (e) repeating said steps (a) through (d) if said recomputed global error is greater thin said desired global error, (f) computing a first plurality of MOSFET parameters which correspond to said plurality of neural functions and represent a first plurality of MOSFET channel widths and lengths, and (g) computing a second plurality of MOSFET parameters which correspond to said plurality of neural weight values and represent a second plurality of MOSFET channel widths and lengths; and generating and outputting a fifth plurality of data signals representing said first and second pluralities of MOSFET parameters, receiving said fifth plurality of data signals and in accordance therewith fabricating a plurality of MOSFETs which include said first and second pluralities of MOS- FET channel widths and lengths based upon said first and second pluralities of MOSFET parameters.

12. The method of claim 11, wherein said step (a) comprises computing an actual global error iteratively in accordance with said plurality of neural functions and said plurality of neural weight values and in accordance therewith determining a desired global error minima and in accordance therewith modifying selected ones of said plurality of neural weight values.

13. The method of claim 11, wherein:

said method further comprises, prior to said step (a), the steps of:

generating and storing a sixth plurality of data signals representing a plurality of initial functions for said plurality of neural functions; and generating and storing a seventh plurality of data signals representing a plurality of expected values of neural function implementation errors;

processing said sixth and seventh pluralities of data signals along with said first, second, third and fourth pluralities of data signals to perform said steps (a), (b), (c), (d), (e), (f) and (g);

said step (a) comprises computing an actual global error iteratively in accordance with said plurality of neural functions and said plurality of neural weight values and in accordance therewith modifying selected ones of said plurality of neural weight values and selected ones of said plurality of neural functions;

said step (b) further comprises modifying said plurality of neural functions in accordance with said plurality of expected values of neural function implementation errors to establish a plurality of error adjusted neural functions; and said step (c) comprises recomputing said actual global error in accordance with said plurality of error adjusted neural functions and said plurality of error adjusted neural weight values to establish a recomputed global error.

14. The method of claim 11, wherein said step (a) comprises performing an iterative gradient descent computation with said plurality of neural functions and said plurality of neural weight values.

15. The method of claim 11, wherein said step (a) comprises performing back propagation with a learning rate and momentum associated therewith.

* * * * *

UNITED STATES PATENT AND TRADEMARK OFFICE
CERTIFICATE OF CORRECTION

PATENT NO. : 5,717,833
DATED : February 10, 1998
INVENTOR(S) : William Shields Neely It is certified that error appears in the above-identified patent and that said Letters Patent is hereby corrected as shown below:

In Col. 6, line 7, delete second occurrence of "said".

In Col. 7, line 7, delete "W" and replace with --to--.

In Col. 7, line 26, delete "and".

In Col. 7, line 29, after "parameters;" insert --and--.

In Col. 8, line 52, delete "thin" and replace with --than--.

In Col. 9, line 21, after "(b)" delete "." and replace with --,--.

Signed and Sealed this

Fifth Day of May, 1998

Attest:

BRUCE LEHMAN

Attesting Officer

Commissioner of Patents and Trademarks